(12) United States Patent
Abe et al.

(10) Patent No.: US 7,710,670 B2
(45) Date of Patent: May 4, 2010

(54) ND FILTER

(75) Inventors: Susumu Abe, Utsunomiya (JP); Sayoko Amano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 11/669,499

(22) Filed: Jan. 31, 2007

(65) Prior Publication Data
US 2007/0183069 A1    Aug. 9, 2007

(30) Foreign Application Priority Data
Feb. 3, 2006    (JP)    ............... 2006-026749
Jan. 9, 2007    (JP)    ............... 2007-001180

(51) Int. Cl.
*G02B 5/22*    (2006.01)
*G02B 1/10*    (2006.01)

(52) U.S. Cl. .................. 359/888; 359/890; 359/585

(58) Field of Classification Search .......... 359/585, 359/888
See application file for complete search history.

(56) References Cited

U.S. PATENT DOCUMENTS 5,688,608 A * 11/1997 Tsai et al. ............ 428/696
5,715,103 A    2/1998 Amano et al. ......... 359/888
2006/0018050 A1 * 1/2006 Okami et al. .......... 359/888

FOREIGN PATENT DOCUMENTS

| JP | 7-63915 | 3/1995 |
|---|---|---|
| JP | 3359114 B2 | 10/2002 |
| JP | 2003-344612 | 12/2003 |

* cited by examiner

*Primary Examiner*—Stephone B Allen
*Assistant Examiner*—Jade R Callaway
(74) *Attorney, Agent, or Firm*—Fitzpatrick, Cella, Harper & Scinto

(57) ABSTRACT

An ND filter including an alternating layer which is composed of two films being alternately stacked and formed on a transparent substrate, the two films having different refractive indexes, wherein the alternating layer has a substrate-side reflected light attenuating multi-layered film and a transmittance adjusting multi-layered film formed on the transparent substrate in the stated order from the transparent substrate side, and the light absorption amount of the substrate-side reflected light attenuating multi-layered film is set to be 20% or more and 30% or less. Thus, an ND filter having satisfactory front surface reflection characteristics and rear surface reflection characteristics can be stably obtained while the transmittance of 4% or more and 11% or less is maintained with respect to the entire visible region (400 nm or more and 700 nm or less).

1 Claim, 13 Drawing Sheets

| LAYER NO. | FILM MATERIAL | PHYSICAL FILM THICKNESS (nm) |
|---|---|---|
| (SUBSTRATE) | S-BSL7 | |
| 1 | $Al_2O_3$ | 63.06 |
| 2 | TiO | 6.00 |
| 3 | $Al_2O_3$ | 41.35 |
| 4 | TiO | 6.00 |
| 5 | $Al_2O_3$ | 43.06 |
| 6 | TiO | 15.99 |
| 7 | $Al_2O_3$ | 42.59 |
| 8 | TiO | 6.00 |
| 9 | $Al_2O_3$ | 36.65 |
| 10 | TiO | 6.00 |
| 11 | $MgF_2$ | 79.15 |
| (SOLUTE) | AIR | |

FIG. 5

| LAYER NO. | FILM MATERIAL | PHYSICAL FILM THICKNESS (nm) |
|---|---|---|
| (SUBSTRATE) | S-BSL7 | |
| 1 | $Al_2O_3$ | 63.06 |
| 2 | TiO | 6.00 |
| 3 | $Al_2O_3$ | 41.35 |
| 4 | TiO | 6.00 |
| 5 | $Al_2O_3$ | 43.06 |
| 6 | TiO | 15.99 |
| 7 | $Al_2O_3$ | 42.59 |
| 8 | TiO | 6.00 |
| 9 | $Al_2O_3$ | 36.65 |
| 10 | TiO | 6.00 |
| 11 | $MgF_2$ | 79.15 |
| (SOLUTE) | AIR | |

FIG. 7

| LAYER NO. | FILM MATERIAL | PHYSICAL FILM THICKNESS (nm) |
|---|---|---|
| (SUBSTRATE) | S-BSL7 | |
| 1 | Al$_2$O$_3$ | 63.06 |
| 2 | TiO | 6.00 |
| 3 | Al$_2$O$_3$ | 41.35 |
| 4 | TiO | 8.00 |
| 5 | Al$_2$O$_3$ | 43.06 |
| 6 | TiO | 26.48 |
| 7 | Al$_2$O$_3$ | 42.59 |
| 8 | TiO | 8.00 |
| 9 | Al$_2$O$_3$ | 36.65 |
| 10 | TiO | 6.00 |
| 11 | MgF$_2$ | 79.15 |
| (SOLUTE) | AIR | |

FIG. 9

| LAYER NO. | FILM MATERIAL | PHYSICAL FILM THICKNESS (nm) |
|---|---|---|
| (SUBSTRATE) | S-BSL7 | |
| 1 | Al2O3 | 63.06 |
| 2 | TiO | 6.00 |
| 3 | Al2O3 | 41.35 |
| 4 | TiO | 14.00 |
| 5 | Al2O3 | 43.06 |
| 6 | TiO | 14.00 |
| 7 | Al2O3 | 78.77 |
| 8 | TiO | 6.00 |
| 9 | Al2O3 | 79.97 |
| (SOLUTE) | AIR | |

FIG. 11

| LAYER NO. | FILM MATERIAL | PHYSICAL FILM THICKNESS (nm) |
| --- | --- | --- |
| (SUBSTRATE) | S-BSL7 | |
| 1 | $Al_2O_3$ | 17.90 |
| 2 | TiO | 11.00 |
| 3 | $Al_2O_3$ | 40.71 |
| 4 | TiO | 6.28 |
| 5 | $Al_2O_3$ | 54.60 |
| 6 | TiO | 14.59 |
| 7 | $Al_2O_3$ | 69.90 |
| 8 | TiO | 7.73 |
| 9 | $Al_2O_3$ | 88.47 |
| (SOLUTE) | AIR | |

FIG. 13

| LAYER NO. | FILM MATERIAL | PHYSICAL FILM THICKNESS (nm) |
|---|---|---|
| (SUBSTRATE) | S-BSL7 | |
| 1 | $SiO_2$ | 80.00 |
| 2 | $NbO_x$ | 5.00 |
| 3 | $SiO_2$ | 49.11 |
| 4 | $NbO_x$ | 5.00 |
| 5 | $SiO_2$ | 47.23 |
| 6 | $NbO_x$ | 15.92 |
| 7 | $SiO_2$ | 74.57 |
| 8 | $NbO_x$ | 5.00 |
| 9 | $SiO_2$ | 1.83 |
| 10 | $NbO_x$ | 5.00 |
| 11 | $SiO_2$ | 78.96 |
| (SOLUTE) | AIR | |

ND FILTER

BACKGROUND OF THE INVENTION

1. Field of the Invention

The present invention relates to a neutral density (ND) filter and a method of producing the same, and more particularly, to a reduction in reflectance of a front surface and a rear surface of an ND filter and a stable production thereof.

2. Description of the Related Art

Up to now, in a photographing optical system, when a luminance of a subject is too high, even when a diaphragm is closed (an aperture diameter is set to be small), a predetermined amount or more of light may enter on a photosensitive plane. Therefore, an ND filter is mounted in a portion of the photographing optical system, thereby regulating the amount of light entering on the photosensitive plane.

Spectral characteristics of the ND filter in this case are required to have a uniform transmittance over an entire visible region for the purpose of merely reducing the amount of incident light. As the ND filter, a glass filter obtained by dissolving an absorbing material in glass (transparent substrate), a sheet filter formed in a film shape containing a pigment, and the like are used in many cases.

However, those ND filters have problems in terms of durability, that is, the spectral characteristics are not uniform (neutrality) over the entire visible region, the spectral characteristics change after a long-term use, and abnormality occurs in an outer appearance.

As a method of solving the above-mentioned problems, Japanese Patent No. 3,359,114 discloses a use of a thin ND filter obtained by vacuum film formation. The thin ND filter is formed of a multi-layered film in which a metal oxide layer and a dielectric layer are stacked. In this case, the metal oxide layer is used as an absorbing layer with respect to incident light. Further, the thin film ND filter exhibits a function as a reflection preventing film by adjusting thicknesses of the metal oxide layer and the dielectric layer.

In recent years, with further miniaturization of a camera and configuration of a sensor as a charge-coupled device (CCD), a positional relationship between a lens system and a CCD sensor tends to approach each other. Therefore, there arises a problem in that return light reflected when a part of incident light is reflected by a CCD plane becomes ghost or flare to influence image quality. Specifically, the ND filter is required to be excellent in rear surface reflection preventing characteristics, as well as flat transmittance characteristics and front surface reflection preventing characteristics. However, among the thin film ND filters described in Japanese Patent No. 3,359,114, those of a type having a multi-layered film on one surface are insufficient in terms of the rear surface reflection preventing characteristics, although they are excellent in front surface reflection preventing characteristics. Further, in the ND filters of a type having a multi-layered film on both surfaces, the rear surface reflection preventing characteristics can be obtained, but the number of film formation and costs are doubled. As a result, those cannot be realized in terms of production.

Japanese Patent Application Laid-Open No. 2003-344612 discloses an example of an ND filter that realizes satisfactory front surface reflection preventing characteristics and rear surface reflection preventing characteristics, and a transmittance of 10% or less. However, in Japanese Patent Application Laid-Open No. 2003-344612, $TiO_2$, $Nb_2O_5$, $ZrO_2$, and the like used as examples of materials having a refractive index of 2.0 or more are generally used for film formation in an oxygen atmosphere so as to secure a stability of a refractive index and transparency. In this case, an optical constant of the light absorbing film changes due to a change in an oxygen partial pressure after film formation and the like, and in particular, a large variation occurs in the rear surface reflection.

In order to address a degradation or the like in image quality caused by a diffraction due to a small diaphragm accompanied with high sensitivity and high integration of a recent imaging element, there is a demand for an ND filter of a high concentration with an optical concentration of about 1 or more, i.e., a transmittance of about 10% or less. Therefore, it is necessary to increase a total thickness of an absorbing film for absorbing incident light.

In general, a thickness of each layer of the absorbing film may be increased so as to address the ND filter of a high concentration. However, if the absorbing film is increased in thickness, it is difficult to obtain a reflection preventing effect using light interference as in a multi-layered transparent optical thin film because incident light is attenuated in each layer. Further, the ND filter is likely to be influenced by a change in optical constants (refractive index and absorption coefficient) of the light absorbing film itself, whereby optical performance is not stable. Thus, there is also a problem in that flatness of transmitted light is difficult to be maintained due to wavelength dependency of the absorption coefficient of the absorbing film.

In order to solve the above-mentioned problems, it is possible to divide the absorbing film into a plurality of layers, thereby ensuring the reflection preventing effect and the transmittance flatness. However, in this case, the entire number of layers increases to a large extent, whereby cost increases due to increase in a film-formation time. Further, the layer configuration designed considering the front surface reflection preventing characteristics does not satisfy the rear surface reflection preventing characteristics, so that the rear surface reflection preventing characteristics become insufficient.

SUMMARY OF THE INVENTION

An object of the present application is to provide an ND filter capable of reducing an increase in number of layers while maintaining a stable optical performance (transmittance, front surface reflectance, rear surface reflectance) over an entire visible region even with respect to a change in an optical constant of a light absorbing film.

In order to achieve the object, the present invention provides an ND filter including: a transparent substrate, and an alternating layer composed of two films being alternately stacked and formed on the transparent substrate, the two films having different refractive indexes, wherein the alternating layer has a substrate-side reflected light attenuating multi-layered film and a transmittance adjusting multi-layered film formed on the transparent substrate in the stated order from on the side of the transparent substrate, and a light absorption amount of the substrate-side reflected light attenuating multi-layered film is 20% or more and 30% or less.

Further, the present invention provides an ND filter including: a transparent substrate, and an alternating layer composed of two films being alternately stacked and formed on the transparent substrate, the two films having different refractive indexes, wherein the alternating layer has a substrate-side reflected light attenuating multi-layered film, a transmittance adjusting multi-layered film, and a front-surface side reflected light attenuating multi-layered film are formed on the transparent substrate in the stated order from the side of the transparent substrate, and a light absorption amount of the substrate-side reflected light attenuating multi-layered film and the front-surface side reflected light attenuating multi-layered film is 20% or more and 30% or less.

Further features of the present invention will become apparent from the following description of exemplary embodiments with reference to the attached drawings.

BRIEF DESCRIPTION OF THE DRAWINGS

FIG. 5 is a table showing a film configuration of an ND filter according to Example 1 of the present invention.

FIG. 7 is a table showing a film configuration of an ND filter according to Example 2 of the present invention.

FIG. 9 is a table showing a film configuration of an ND filter according to Example 3 of the present invention.

FIG. 11 is a table showing a film configuration of an ND filter according to Comparative Example 1 of the present invention.

FIG. 13 is a table showing a film configuration of an ND filter formed of a multi-layered film of $NbO_x$ and $SiO_2$.

DESCRIPTION OF THE EMBODIMENTS

Figure 1:
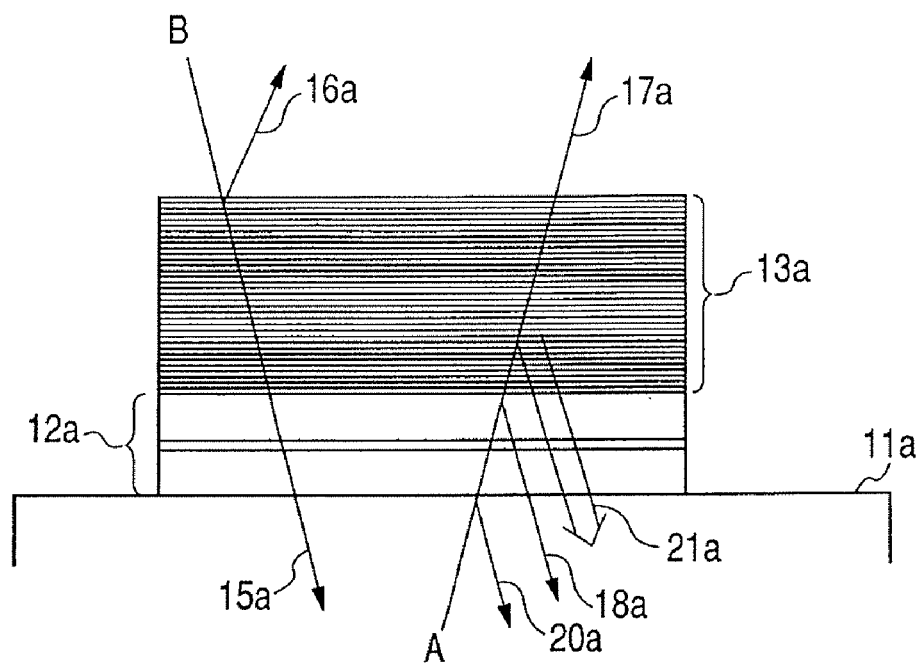
FIG. 1 is a cross-sectional view of an ND filter according to the present invention.

According to the present invention, in a multi-layered film including stacked metal oxide films and dielectric films, a reflected light attenuating multi-layered film 12a is placed on a substrate side, in which the thickness of a dielectric film is set to be large and the thickness of a metal oxide film is set to be small. The reflected light attenuating multi-layered film 12a absorbs incident light and reflected light from the rear surface to enhance rear surface reflection preventing characteristics. Further, the transmittance is adjusted by adjusting the thickness of a transmittance adjusting multi-layered film 13a. A description will be made with reference to FIG. 1. As shown in FIG. 1, the ND filter of the present invention has a configuration in which the substrate-side reflected light attenuating multi-layered film 12a and the transmittance adjusting multi-layered film 13a are stacked successively on a transparent substrate 11a. Each of the substrate-side reflected light attenuating multi-layered film 12a and the transmittance adjusting multi-layered film 13a is a multi-layered film in which metal oxide films and dielectric films are alternately stacked. The substrate-side reflected light attenuating multi-layered film 12a functions as an attenuating film of reflected light mainly from a rear surface by setting the metal oxide film to be thin and the dielectric film to be thick. Further, the transmittance adjusting multi-layered film 13a functions as an absorbing film mainly for transmitted light by setting the metal oxide film to be thick and the dielectric layer film to be thin. It is desirable that the light absorption amount of the substrate-side reflected light attenuating multi-layered film 12a is 20% or more and 30% or less. Further, the transmittance adjusting multi-layered film 13a is designed so as to obtain a reflection preventing effect owing to light interference between multi-layered films, with respect to incident light from a front surface.

Herein, the mechanism of preventing the rear surface reflection of the ND filter in the present invention will be described. For ease of description, the mechanism will be described in comparison with a conventional ND filter shown in FIG. 2 which includes a multi-layered film composed of metal oxide films and dielectric films being stacked, designed considering the front surface reflection preventing characteristics. The arrow A of FIG. 1 denotes incident light from a substrate side of the ND filter. A part of the incident light A is reflected by a boundary plane between the transparent substrate 11a and the substrate-side reflected light attenuating multi-layered film 12a to become a reflected light 20a. Next, about 30% of the incident light A that has not been reflected by the front surface of the substrate-side reflected light attenuating multi-layered film 12a is absorbed by the substrate-side reflected light attenuating multi-layered film 12a. A part of the incident light A transmitted through the substrate-side reflected light attenuating multi-layered film 12a is reflected by the boundary plane between the substrate-side reflected light attenuating multi-layered film 12a and the transmittance adjusting multi-layered film 13a to become a reflected light 18a. About 30% of the reflected light 18a is absorbed by the substrate-side reflected light attenuating multi-layered film 12a again before being output as reflected light from the front surface of the ND filter.

Incident light B that has not been reflected by the boundary plane between the substrate-side reflected light attenuating multi-layered film 12a and the transmittance adjusting multi-layered film 13a is absorbed by the substrate-side reflected light attenuating multi-layered film 12a and transmitted therethrough to the front surface side as transmitted light 17a. Although the incident light A is reflected even by each boundary plane of the layers of the front-surface side reflected light attenuating multi-layered film 13a as a reflected light 21a, the amount thereof is very small.

Thus, the rear surface reflected light generated by the ND filter with respect to the incident light B has a value obtained by adding the reflected lights 20, 18a and 21a to each other. However, the reflected lights 18a and 21a are obtained by the reflection after the incident light A passes through the substrate-side reflected light attenuating multi-layered film 12a to be absorbed by 30%, and after the reflection, the reflected light 18a and 21a pass through the substrate-side reflected light attenuating multi-layered film 12a again to be absorbed by 30%. Therefore, the amount thereof is very small. Accordingly, the reflected light 20a substantially becomes rear surface reflected light.

Figure 2:
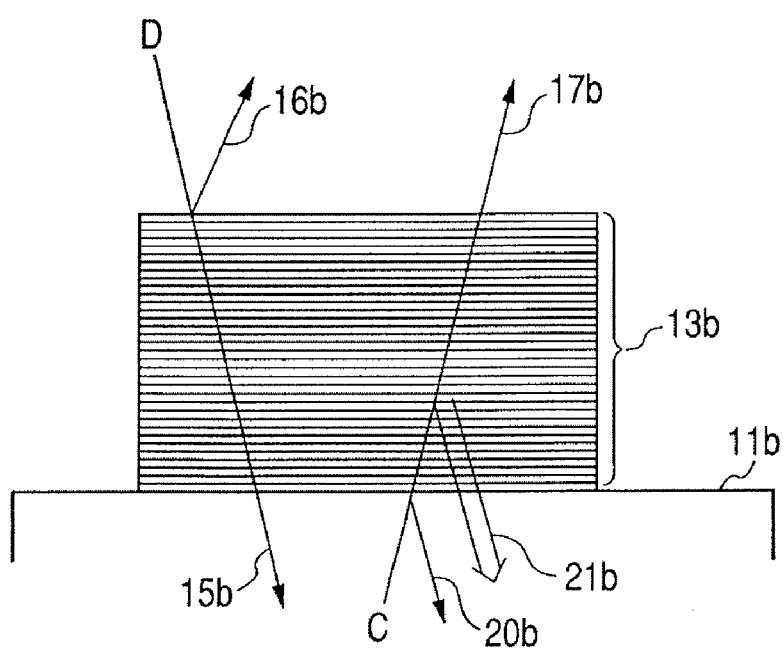
FIG. 2 is a cross-sectional view of a conventional ND filter.

FIG. 2 shows the conventional ND filter including a multi-layered film taking account of the front surface reflection preventing characteristics. It has a configuration in which a transmittance adjusting multi-layered film 13b is stacked on the transparent substrate 11b. The transmittance adjusting multi-layered film 13b is a multi-layered film composed of metal oxide films and dielectric films being alternately stacked. The transmittance adjusting multi-layered film 13b has a plurality of dielectric layers, and mainly functions as an absorbing film of transmitted light. Further, the transmittance adjusting multi-layered film 13b is designed so as to obtain a reflection preventing effect owing to light interference between multi-layered films, with respect to incident light from a front surface. The transmittance adjusting multi-layered film 13b has the same film configuration as that of the transmittance adjusting multi-layered film 13a shown in FIG. 1, and includes a larger number of layers of the multi-layered film so as to obtain an equal transmittance.

The arrow C shown in FIG. 2 denotes incident light from a substrate side of the ND filter. A part of the incident light C becomes a reflected light 20b reflected by a boundary plane between the transparent substrate 11a and the transmittance adjusting multi-layered film 13b. Next, the incident light C that has not been reflected by the boundary plane between the transparent substrate 11a and the transmittance adjusting multi-layered film 13b is reflected by each boundary plane of the layers of the transmittance adjusting multi-layered film 13b as a reflected light 21b. Unlike the case in FIG. 1, the reflected light 21b is not transmitted through the substrate-side reflected light attenuating multi-layered film, so that the amount of the reflected light 21b does not become a negligible small value compared with that of the reflected light 20b. The incident light C that has been neither reflected nor absorbed by the transmittance adjusting multi-layered film 13b is transmitted to the front surface side as transmitted light 17b. Thus, the rear surface reflected light by the ND filter with respect to the incident light C becomes a sum of the reflected light 20b and the reflected light 21b reflected by each boundary plane of the layers of the transmittance adjusting multi-layered film 13b.

The reflected lights 20a, 18a, and 21a that are rear surface reflected lights shown in FIG. 1 are compared with the reflected lights 20b and 21b that are rear surface reflected lights in FIG. 2. The reflected lights 20a and 20b are both reflected by an interface with the glass substrate, and exhibit substantially the same value. As described above, the reflected lights 18a and 21a are very small, which exhibits a substantially negligible value. In contrast, the reflected light 21b does not exhibit a negligible value compared with the reflected light 20b. Thus, it is found that the rear surface reflection preventing characteristics of the ND filter shown in FIG. 1 are remarkably enhanced compared with the rear surface reflection preventing characteristics of the ND filter shown in FIG. 2. Further, the number of layers of the ND filter shown in FIG. 1 is smaller than that of the ND filter shown in FIG. 2, so that a production time is short, which can realize a reduction in cost.

Figure 3:
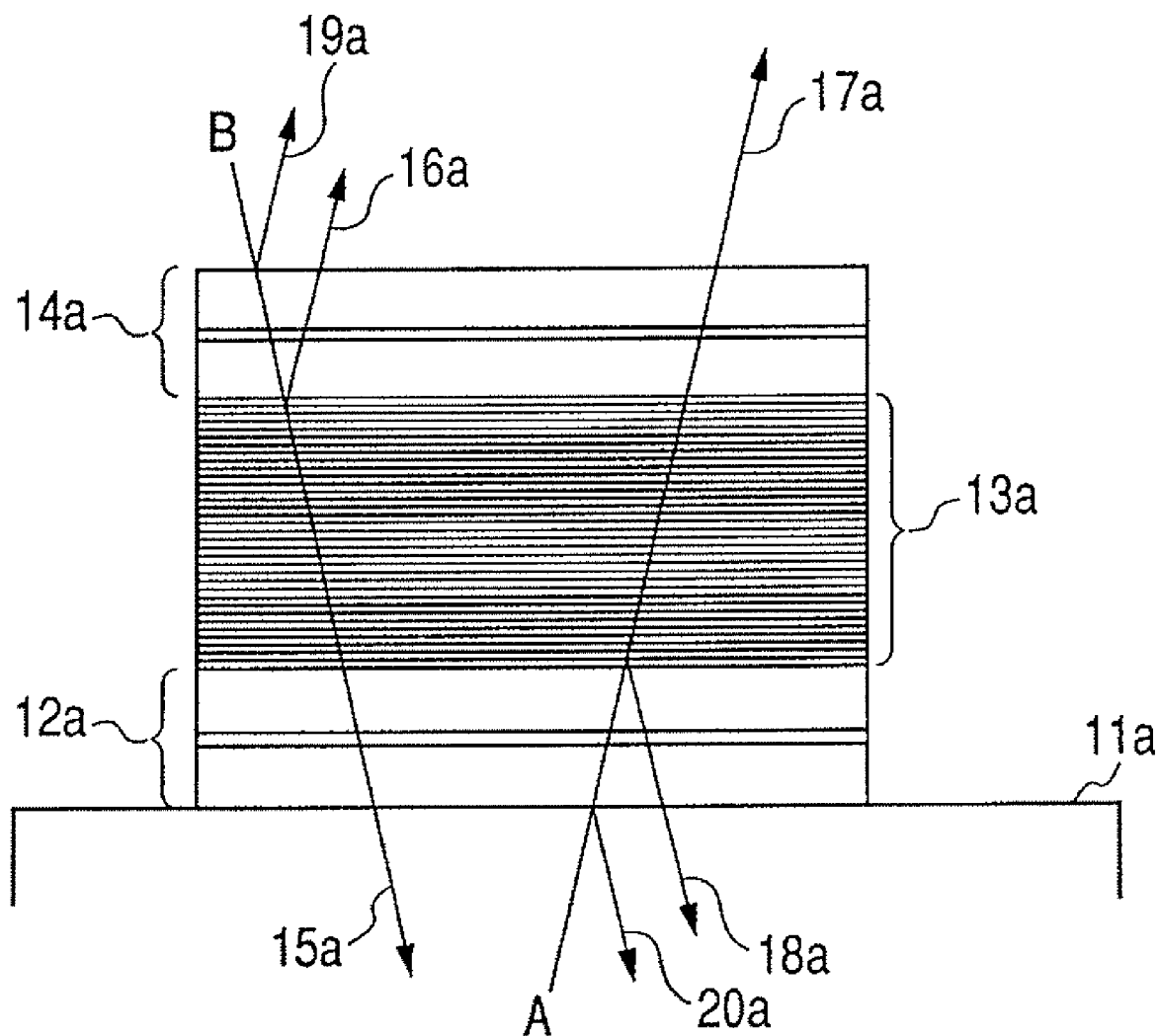
FIG. 3 is a cross-sectional view of the ND filter according to the present invention.

In FIG. 1, the reflected light attenuating multi-layered film is provided only on a substrate side. However, the present invention is not limited thereto. As shown in FIG. 3, a front surface side reflected light attenuating multi-layered film 14a can also be provided on the front surface (medium side) of the ND filter. The configuration of the front surface side reflected light attenuating multi-layered film 14a is the same as that of the substrate-side reflected light attenuating multi-layered film 12a.

An arrow B shown in FIG. 3 denotes incident light from the front surface side of the ND filter. A part of the incident light B is reflected by the front surface of the front surface side reflected light attenuating multi-layered film 14a to become a reflected light 19a. The amount of the reflected light 19a is slightly larger than that of an ordinary reflection preventing film, since the thickness of a dielectric film of the front surface side reflected light attenuating multi-layered film 14a is large. About 30% of the incident light B that has not been reflected by the front surface of the substrate-side reflected light attenuating multi-layered film 14a is absorbed by the front surface side reflected light attenuating multi-layered film 14a. A part of the incident light B transmitted through the front surface side reflected light attenuating multi-layered film 14a is reflected by the boundary plane between the front surface side reflected light attenuating multi-layered film 14a and the transmittance adjusting multi-layered film 13a to become a reflected light 16a. About 30% of the reflected light 16a is absorbed by the substrate-side reflected light attenuating multi-layered film 14a before being output as reflected light from the front surface of the ND filter.

The incident light that has not been reflected by the boundary plane between the substrate-side reflected light attenuating multi-layered film 14a and the transmittance adjusting multi-layered film 13a is absorbed by the substrate-side reflected light attenuating multi-layered film 14a to be transmitted therethrough to the substrate side as 10% or less of a transmitted light 15a. Although the incident light B is reflected even by each boundary plane of the layers of the surface-side reflected light attenuating multi-layered film 13a, the amount thereof is very small. Thus, it can be considered that the surface reflection preventing characteristics in the case of FIG. 3 is substantially the same as those of the surface reflection preventing characteristics in the case of FIG. 1.

The first feature of the present invention resides in that the light absorbing film used for the purpose of controlling transmittance is stacked in a divided state, and the absorbing films on a side closest to the surface and on a side closest to the substrate are provided as reflected light attenuating films. Generally, an optical multi-layered film utilizing interference is influenced by an optical constant of the entire multi-layered film system. Therefore, in the case where the optical constant of the layer in the course of film formation changes, the optical characteristics of the entire multi-layered film system changes. This is a serious problem that influences the production stability and yield, particularly in the case where an incomplete metal oxide is utilized as an absorbing film. In contrast, in the case of using a reflected light attenuating multi-layered film, the incident light A and the reflected light 18a from the boundary plane between the substrate-side reflected light attenuating film 12a and the transmittance adjusting multi-layered film 13a are directly attenuated by the reflected light attenuating multi-layered film 12a. Therefore, the influence of a change in optical constant of the transmittance adjusting multi-layered film 13a can be reduced.

Next, the second feature of the present invention resides in that the light absorption amount in each layer of the first light absorbing film seen from the substrate side and the first light absorbing film seen from the surface (solute) is 20% or more and 30% or less. When the light absorption amount exceeds 30%, the reflectance from the corresponding film portion cannot be reduced sufficiently, which has an adverse effect on the remaining reflectance. Further, when the light absorption amount is smaller than 20%, the influence of a change in optical constant of the transmittance adjusting multi-layered film 13a cannot be reduced sufficiently.

Figure 4:
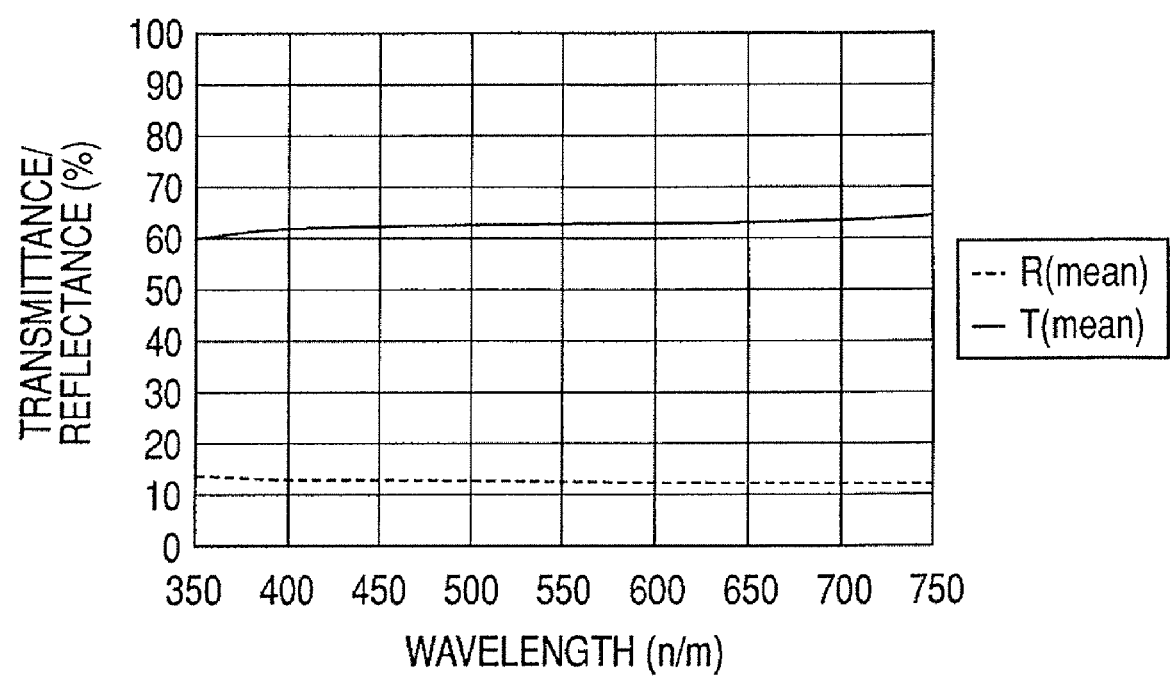
FIG. 4 is a spectral characteristics diagram of the ND filter according to the present invention.

For example, a spectral characteristics diagram in a TiO single layer in the case of using TiO as an absorbing film is shown in FIG. 4. It can be confirmed from FIG. 4 that, for example, in the case of using an absorbing film of TiO, the transmittance (T in FIG. 4) is 60% when the thickness is about 6 nm and the absorption amount of the corresponding film is 30% when the reflectance (R in FIG. 4) is 10%. In this case, the following was confirmed by simulation and an experiment: the reflectance of the first light absorbing film seen from the substrate side and the reflectance from the first light absorbing single film seen from the substrate side are 10% which is a low value, and the reflected light can be sufficiently reduced owing to light interference with the transparent dielectric films provided before and after the light absorbing film.

Further, in the case where the light incident from the outside is reflected by the transmittance adjusting multi-layered film 13a and returns to the outside, the light reciprocates in the light absorbing film. Therefore, the influence amount thereof becomes (100%−30%)×(100%−30%)=49%. Thus, the influence amount of the transmittance adjusting multi-layered film 13a in the reflected light can be reduced to a half or less, so that the absorption amount of the above-described films were set to be 30% or less, and desirably 20% or more and 30% or less in the present application.

Next, the third feature of the present invention resides in that the transmittance of the ND filter according to the present invention is set to be 25% or less. As described above, in the case of setting the light attenuation amount in the reflected light attenuating multi-layered films 12a and 14a to be 30%, respectively, the entire light amount is attenuated to 49% merely with the reflected light attenuating multi-layered films 12a and 14a. Therefore, as a result of considering that the range of a transmittance adjustment by the transmittance adjusting multi-layered film 13a decreases, the absorption amount equal to that by the reflected light attenuating multi-layered films 12a and 14a was set so as to be adjustable by the transmittance adjusting multi-layered film 13a. Consequently, the transmittance of the ND filter according to the present invention was set to be 25% or less.

Next, the fourth feature of the present invention reside in that the ND filter is formed by vacuum vapor deposition or sputtering. By setting a processing atmosphere to be a vacuum state to reduce the oxygen amount during film formation, it becomes possible to keep the oxidation state of a metal oxide that is an absorbing film material used in the present invention to be constant, which enables the stabilization of an optical constant during film formation.

Next, the fifth feature of the present invention resides in that the control of transmittance (T1 and Tn) of a layer having a reflected light attenuating effect depending upon the thickness is performed by adjusting the amount of transmitted light. Generally, as a method of controlling the thickness of a thin film by vacuum film formation, a method using a quartz vibrator, a method of monitoring a change in optical characteristics of a thin film, and the like are mostly used. However, according to the present invention, it was verified by an experiment that a method of changing a transmittance of an absorbing film, for example, a method of changing a transmittance of 90% at the time of starting to a transmittance of 70% at the time of ending is satisfactory, for reproducibility for the purpose of enhancing the control precision of the amount of transmitted light.

Hereinafter, the examples of the present invention will be described.

EXAMPLE 1

Figure 6:
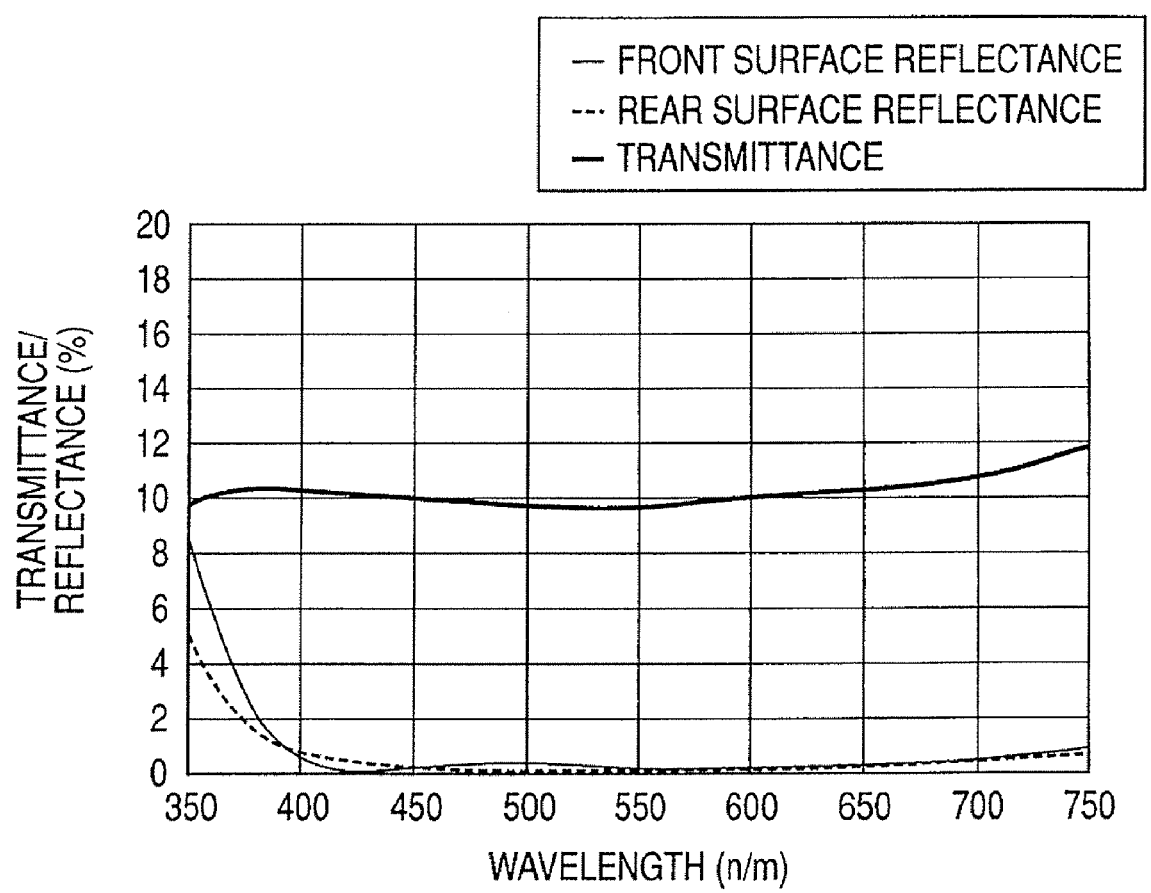
FIG. 6 is a spectral characteristics diagram of the ND filter according to Example 1 of the present invention.

This example shows an ND filter having a film configuration shown in FIG. 3, and optical glass is used as a transparent substrate 11a, and a reflected light attenuating multi-layered film 12a has a 3-layered configuration of $Al_2O_3/TiO/Al_2O_3$. A transmittance adjusting multi-layered film 13a has a 5-layered configuration of $TiO/Al_2O_3/TiO/Al_2O_3/TiO$. Further, a reflected light attenuating multi-layered film 14a has a 3-layered configuration of $Al_2O_3/TiO/MgF_2$. The thickness of TiO in the reflected light attenuating multi-layered films 12a and 14a was set to be 6 nm. The light absorption amount in the reflected light attenuating multi-layered film 12a and the reflected light attenuating multi-layered film 14a was 25%. The thickness of each layer is as shown in FIG. 5. FIG. 6 shows spectral characteristics of the ND filter.

It is found from FIG. 6 that the transmittance is constant, i.e., 9% or more and 11% or less over the entire visible region (400 nm to 700 nm), the front surface reflectance and the rear surface reflectance are 1% or less, and thus, the ND filter exhibits sufficient performance. Further, TiO can be formed to a constant film thickness as the absorbing film used in the reflected light attenuating multi-layered films 12a and 14a that are features of the present invention. Because of this, the enhancement of film thickness control precision can be expected.

EXAMPLE 2

Figure 8:
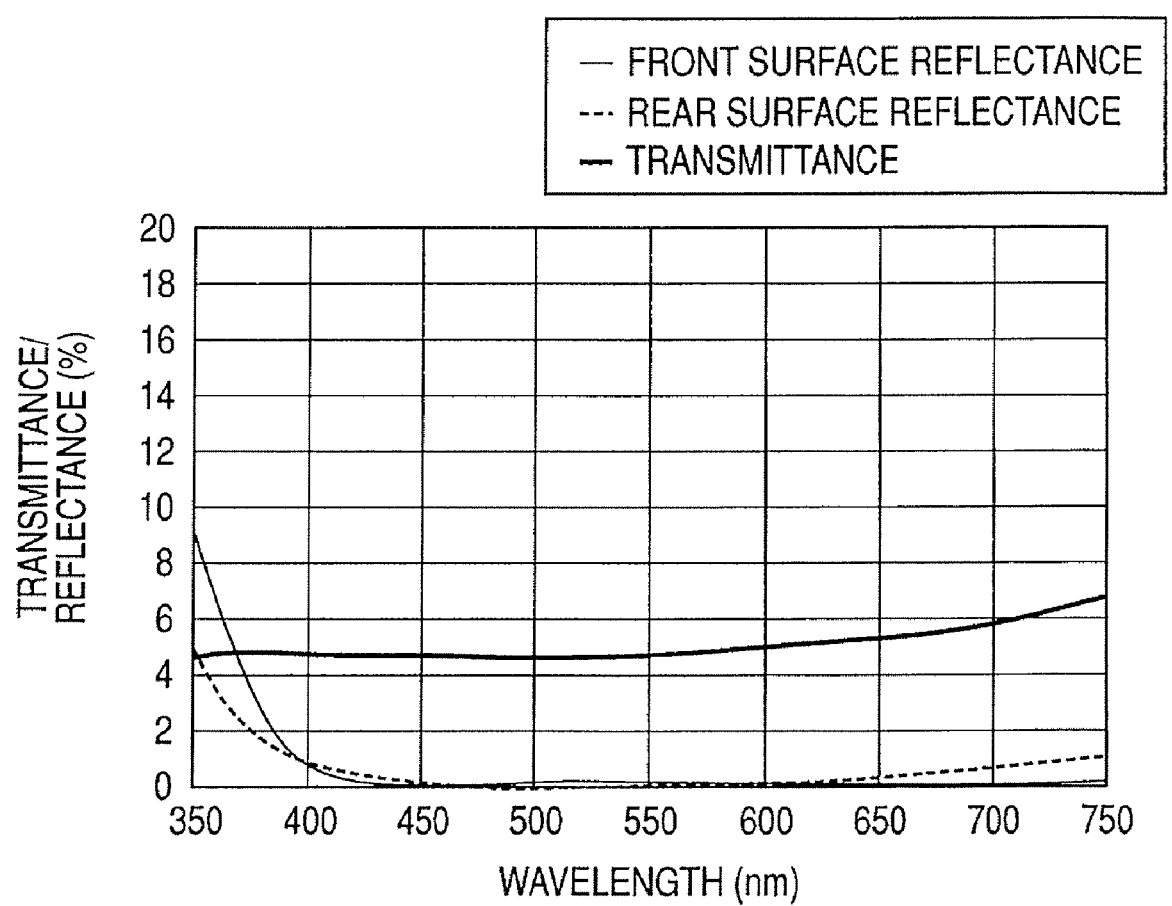
FIG. 8 is a spectral characteristics diagram of the ND filter according to Example 2 of the present invention.

This example shows an ND filter having a film configuration shown in FIG. 3, and optical glass is used as a transparent substrate 11a, and a reflected light attenuating multi-layered film 12a has a 3-layered configuration of $Al_2O_3/TiO/Al_2O_3$. A transmittance adjusting multi-layered film 13a has a 5-layered configuration of $TiO/Al_2O_3/TiO/Al_2O_3/TiO$. Further, a reflected light attenuating multi-layered film 14a has a 3-layered configuration of $Al_2O_3/TiO/MgF_2$. The thickness of TiO in the reflected light attenuating multi-layered films 12a and 14a was set to be 6 nm. The light absorption amount in the reflected light attenuating multi-layered film 12a and the reflected light attenuating multi-layered film 14a was 25%. The thickness of each layer is as shown in FIG. 7. FIG. 8 shows spectral characteristics of the ND filter.

It is found from FIG. 8 that the transmittance is constant, i.e., 4% or more and 6% or less over the entire visible region (400 nm to 700 nm), the front surface reflectance and the rear surface reflectance are 1% or less, and thus, the ND filter exhibits sufficient performance. Further, TiO can be formed to a constant film thickness as the absorbing film used in the reflected light attenuating multi-layered films 12a and 14a that are features of the present invention. Because of this, the enhancement of film thickness control precision can be expected.

Example 2 shows that the transmittance can be freely controlled merely by changing the thickness of a TiO film portion of the transmittance adjusting multi-layered film 13a in the film configuration shown in Example 1, and hence, the usefulness of the present invention can be confirmed.

EXAMPLE 3

Figure 10:
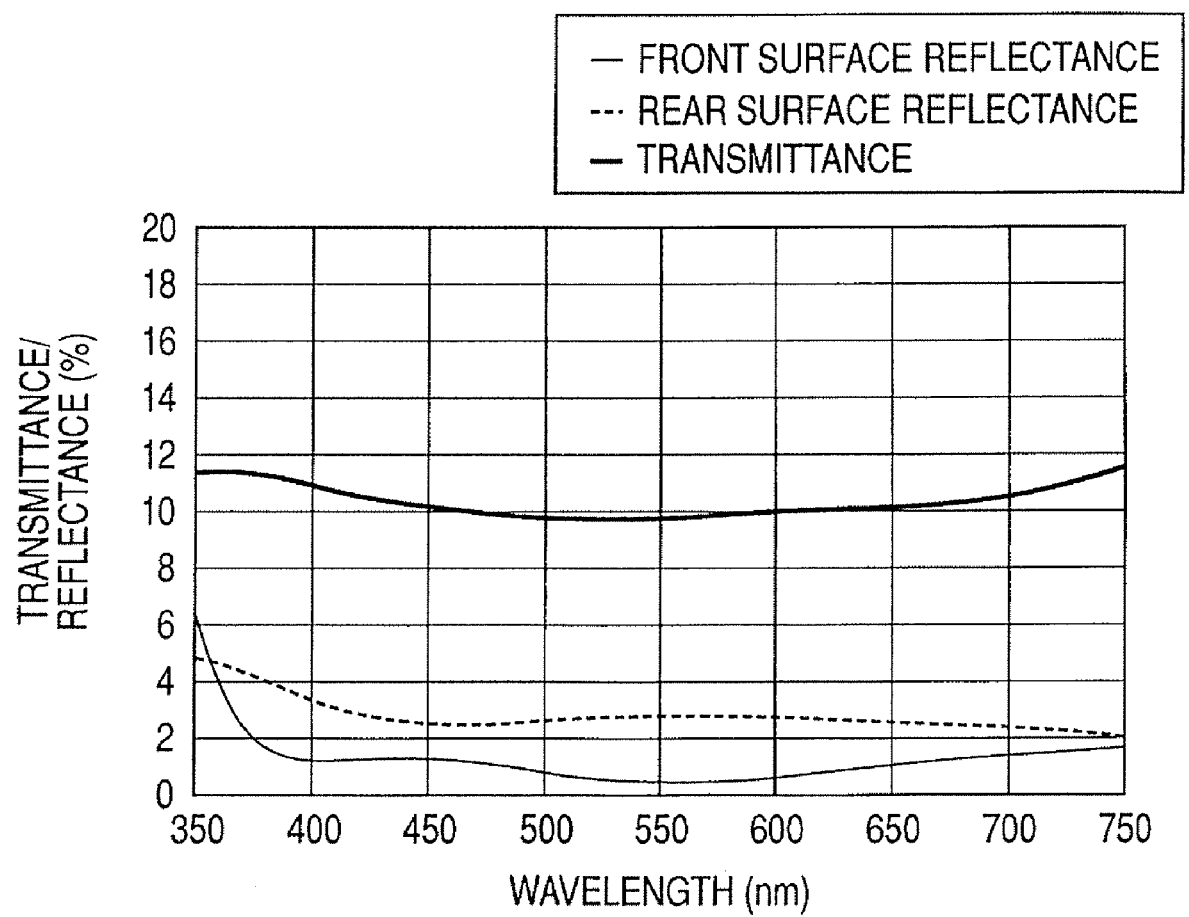
FIG. 10 is a spectral characteristics diagram of the ND filter according to Example 3 of the present invention.

This example shows an ND filter having a film configuration shown in FIG. 3, and optical glass is used as a transparent substrate 11a, and a reflected light attenuating multi-layered film 12a has a 3-layered configuration of $Al_2O_3/TiO/Al_2O_3$. A transmittance adjusting multi-layered film 13a has a 3-layered configuration of $TiO/Al_2O_3/TiO$. Further, a reflected light attenuating multi-layered film 14a has a 3-layered configuration of $Al_2O_3/TiO/MgF_2$. The thickness of TiO in the reflected light attenuating multi-layered films 12a and 14a was set to be 6 nm. The light absorption amount in the reflected light attenuating multi-layered film 12a and the reflected light attenuating multi-layered film 14a was 25%. The thickness of each layer is as shown in FIG. 9. FIG. 10 shows spectral characteristics of the ND filter.

It is found from FIG. 10 that the transmittance is constant, i.e., 9% or more and 11% or less over the entire visible region (400 nm to 700 nm), the front surface reflectance and the rear surface reflectance are 3% or less, and thus, the ND filter exhibits sufficient performance. Further, TiO can be formed to a constant film thickness as the absorbing film used in the reflected light attenuating multi-layered films 12a and 14a that are features of the present invention. Because of this, the enhancement of film thickness control precision can be expected.

Example 3 realizes a reflectance of 3% or less even with a film configuration simpler than that shown in Example 1, and furthermore, the thickness of TiO can be controlled easily. Thus, the usefulness of the present invention can be confirmed.

COMPARATIVE EXAMPLE 1

Figure 12:
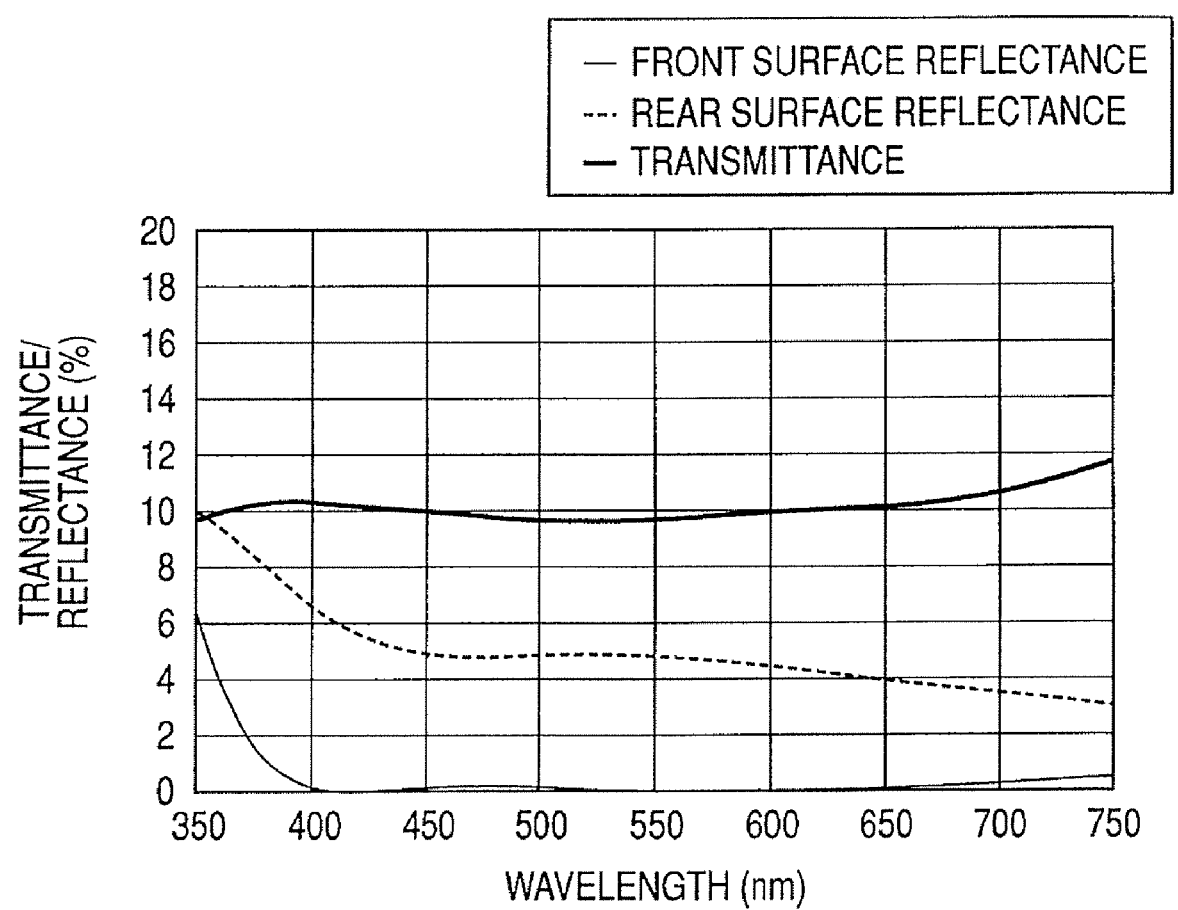
FIG. 12 is a spectral characteristics diagram of the ND filter according to Comparative Example 1 of the present invention.

Comparative Example 1 shows an ND filter having a film configuration shown in FIG. 2, and has a 9-layered configuration of $Al_2O_3$/TiO/$Al_2O_3$/TiO/$Al_2O_3$/TiO/$Al_2O_3$/TiO/$Al_2O_3$. The thickness of each layer is as shown in FIG. 11. The spectral characteristics of the ND filter are shown in FIG. 12. It is found from FIG. 12 that the transmittance is substantially constant, i.e., 9% or more and 11% or less over an entire visible region (400 nm to 700 nm), the front surface reflectance is 1% or less, and hence the ND filter exhibits sufficient performance. However, the rear surface reflectance has a very large value, i.e., 3% to 7%, so that required characteristics cannot be satisfied. As is also apparent from FIG. 11, the thickness of TiO that is an absorbing film varies over the entire layers in Comparative Example 1, so that the ND filter is likely to be influenced by a thickness control error, and it is complicated to set conditions at a time of change in optical concentration.

In the case of the present invention, the reflectance is adjusted by the reflected light attenuating multi-layered film, and the transmittance is adjusted by the transmittance adjusting multi-layered film, for example, so that it is easy to adjust the transmittance. However, Comparative Example 1 does not have portions corresponding to the above film. Therefore, in the case of modifying the thickness of a TiO film so as to adjust the transmittance, the reflectance is degraded simultaneously.

Figure 14:
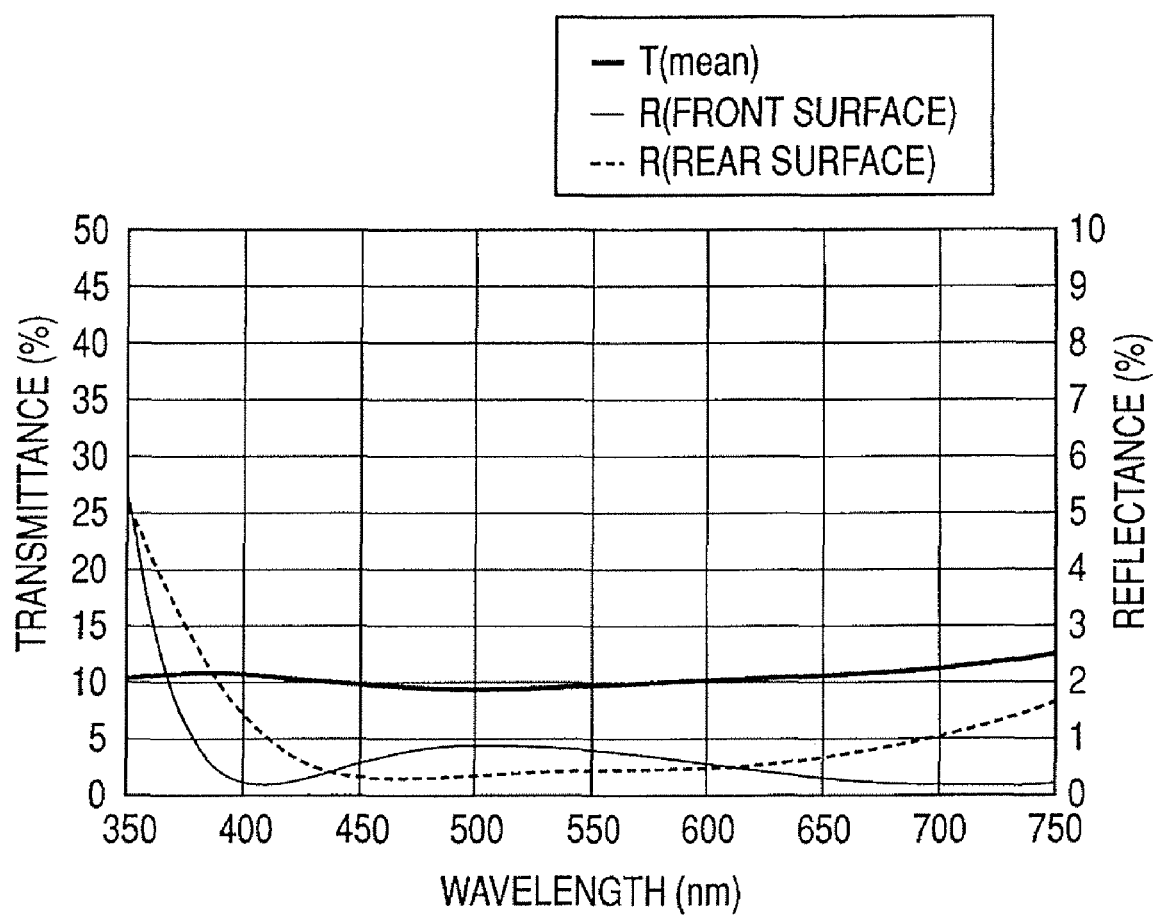
FIG. 14 is a spectral characteristics diagram of the ND filter formed of the multi-layered film of $NbO_x$ and $SiO_2$.

Similarly, even in the case of using $NbO_x$ or the like as a film having light absorption and forming a dielectric portion of $SiO_2$, the effect of the present invention is effective. FIG. 13 shows a film configuration of an example using $NbO_x$ and $SiO_2$, and FIG. 14 show a spectral characteristics diagram of this example. As described above, by carrying out the present invention, an ND filter with optical performance enhanced can be produced stably, so that the reduction in production failure ratio and the reduction in cost can be expected.

By carrying out the invention of the present application, while the transmittance of 12% or less is maintained with respect to the entire visible region (400 nm to 700 nm), an ND filter having satisfactory front surface reflection characteristics and rear surface reflection preventing characteristics can be obtained stably. Further, the following effects can be obtained: the enhancement of optical performance such as the prevention of ghost, interference, and the like, and the enhancement of yield and the reduction in cost during production.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-026749, filed Feb. 3, 2006, and Japanese Patent Application No. 2007-001180, filed Jan. 9, 2007, which are hereby incorporated by reference herein in their entirety.

What is claimed is:
1. An ND filter, comprising:
   a transparent substrate; and
   a lamination consisting of the following layers:
   (a) $Al_2O_3$ of 63.06 nm in thickness,
   (b) TiO of 6.00 nm in thickness,
   (c) $Al_2O_3$ of 41.35 nm in thickness,
   (d) TiO of a value in the range of 6.00 nm to 8.00 nm in thickness,
   (e) $Al_2O_3$ of 43.06 nm in thickness,
   (f) TiO of a value in the range of 15.99 nm to 26.48 nm in thickness,
   (g) $Al_2O_3$ of 42.59 nm in thickness,
   (h) TiO of a value in the range of 6.00 nm to 8.00 nm in thickness,
   (i) $Al_2O_3$ of 36.65 nm in thickness,
   (j) TiO of 6.00 nm in thickness, and
   (k) $MgF_2$ of 79.15 nm in thickness,
   which layers are formed on the transparent substrate in the stated order from a side of the transparent substrate,
   wherein the ND filter has a transmittance of 4% or more and 11% or less, in an entire visible region of 400 nm or more to 700 nm or less.

* * * * *